United States Patent
Jalleh et al.

(10) Patent No.: US 9,953,265 B2
(45) Date of Patent: Apr. 24, 2018

(54) VISUAL SUMMARY OF ANSWERS FROM NATURAL LANGUAGE QUESTION ANSWERING SYSTEMS

(71) Applicant: International Business Machines Corporation, Armonk, NY (US)

(72) Inventors: Sean G. Jalleh, Round Rock, TX (US); Amanda C. Maderic, Austin, TX (US); Andrew Patrick Mankins, Seattle, WA (US); David L. Schwartz, Austin, TX (US); Lila Title, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 481 days.

(21) Appl. No.: 14/707,353

(22) Filed: May 8, 2015

(65) Prior Publication Data
US 2016/0328648 A1 Nov. 10, 2016

(51) Int. Cl.
*G06N 5/04* (2006.01)
*G06F 17/27* (2006.01)
*G06F 17/30* (2006.01)

(52) U.S. Cl.
CPC ............. *G06N 5/04* (2013.01); *G06F 17/27* (2013.01); *G06F 17/30654* (2013.01); *G06F 17/30696* (2013.01)

(58) Field of Classification Search
None
See application file for complete search history.

(56) References Cited

U.S. PATENT DOCUMENTS

| 8,280,838 B2 | 10/2012 | Ferrucci et al. |
| 8,417,514 B2 | 4/2013 | Brown et al. |
| 2007/0073683 A1 | 3/2007 | Kobayashi et al. |
| 2013/0013547 A1* | 1/2013 | Brown .............. G06F 17/30696 706/46 |
| 2013/0018652 A1 | 1/2013 | Ferrucci et al. |

(Continued)

FOREIGN PATENT DOCUMENTS

| WO | 0188662 A2 | 11/2001 |
| WO | 2012040350 A1 | 3/2012 |
| WO | 2012047541 A1 | 4/2012 |

OTHER PUBLICATIONS

Bobrow, "Natural Language Input for a Computer Problem Solving System," Massachusetts Institute of Technology Thesis, Sep. 30, 1964, p. 1-128, IP.com No. 000148975.

(Continued)

*Primary Examiner* — Alan Chen
(74) *Attorney, Agent, or Firm* — Patricia B. Feighan

(57) ABSTRACT

A method for providing a visual summary of a plurality of answers associated with a question entered into a natural language question answer system by a user is provided. The method may include receiving the entered question. The method may also include analyzing the entered question to determine a plurality of possible answers to the entered question. The method may further include compiling a set of answers based on the analysis of the entered question and the determined plurality of possible answers. The method may additionally include providing a characterization summary for the compiled set of answers, whereby the characterization summary includes an indication of the quality associated with each answer within the compiled set of answers.

20 Claims, 7 Drawing Sheets

(56) References Cited

U.S. PATENT DOCUMENTS

2013/0024183 A1  1/2013  Cardie et al.
2014/0115013 A1  4/2014  Anderson
2014/0289386 A1* 9/2014  Vatto .................. H04L 41/5067
                                                     709/223

OTHER PUBLICATIONS

Marine et al., "FYI on Questions and Answers: Answers to Commonly asked 'New Internet User' Questions," Network Working Group Memo, Mar. 1, 1994, 37 pages, IP.com No. 000002428.
Mell et al., "The NIST Definition of Cloud Computing," National Institute of Standards and Technology, Sep. 2011, p. 1-3, Special Publication 800-145.
Tang et al., "Research on Focal Figures-Oriented Sentimental Question Answering," International Conference on Advanced Language Processing and Web Information Technology, 2008, p. 168-174, IEEE Computer Society.

* cited by examiner

VISUAL SUMMARY OF ANSWERS FROM NATURAL LANGUAGE QUESTION ANSWERING SYSTEMS

BACKGROUND

The present invention relates generally to the field of computers, and more particularly to natural language question answer systems.

A question answer (QA) system is a system related to the fields of information retrieval and natural language processing (NLP), which is concerned with building systems that automatically answer questions posed by humans in a natural language. Question answer systems may construct answers by a structured database of knowledge or information, such as a knowledge base or by pulling answers from an unstructured collection of natural language documents. As such, a question answer system may provide an abundance of information and answers to the questions posed by accessing various online and local information sources.

SUMMARY

According to one embodiment, a method for providing a visual summary of a plurality of answers associated with a question entered into a natural language question answer system is provided. The method may include receiving the entered question. The method may also include analyzing the entered question to determine a plurality of possible answers to the entered question. The method may further include compiling a set of answers based on the analysis of the entered question and the determined plurality of possible answers. The method may additionally include providing a characterization summary for the compiled set of answers, whereby the characterization summary includes an indication of the quality associated with each answer within the compiled set of answers.

According to another embodiment, a computer system for providing a visual summary of a plurality of answers associated with a question entered into a natural language question answer system is provided. The computer system may include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing a method. The method may include receiving the entered question. The method may also include analyzing the entered question to determine a plurality of possible answers to the entered question. The method may further include compiling a set of answers based on the analysis of the entered question and the determined plurality of possible answers. The method may additionally include providing a characterization summary for the compiled set of answers, whereby the characterization summary includes an indication of the quality associated with each answer within the compiled set of answers.

According to yet another embodiment, a computer program product for providing a visual summary of a plurality of answers associated with a question entered into a natural language question answer system is provided. The computer program product may include one or more computer-readable storage devices and program instructions stored on at least one of the one or me tangible storage devices, the program instructions executable by a processor. The computer program product may include program instructions to receive the entered question. The computer program product may also include program instructions to analyze the entered question to determine a plurality of possible answers to the entered question. The computer program product may further include program instructions to compile a set of answers based on the analysis of the entered question and the determined plurality of possible answers. The computer program product may additionally include program instructions to provide a characterization summary for the compiled set of answers, whereby the characterization summary includes an indication of the quality associated with each answer within the compiled set of answers.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
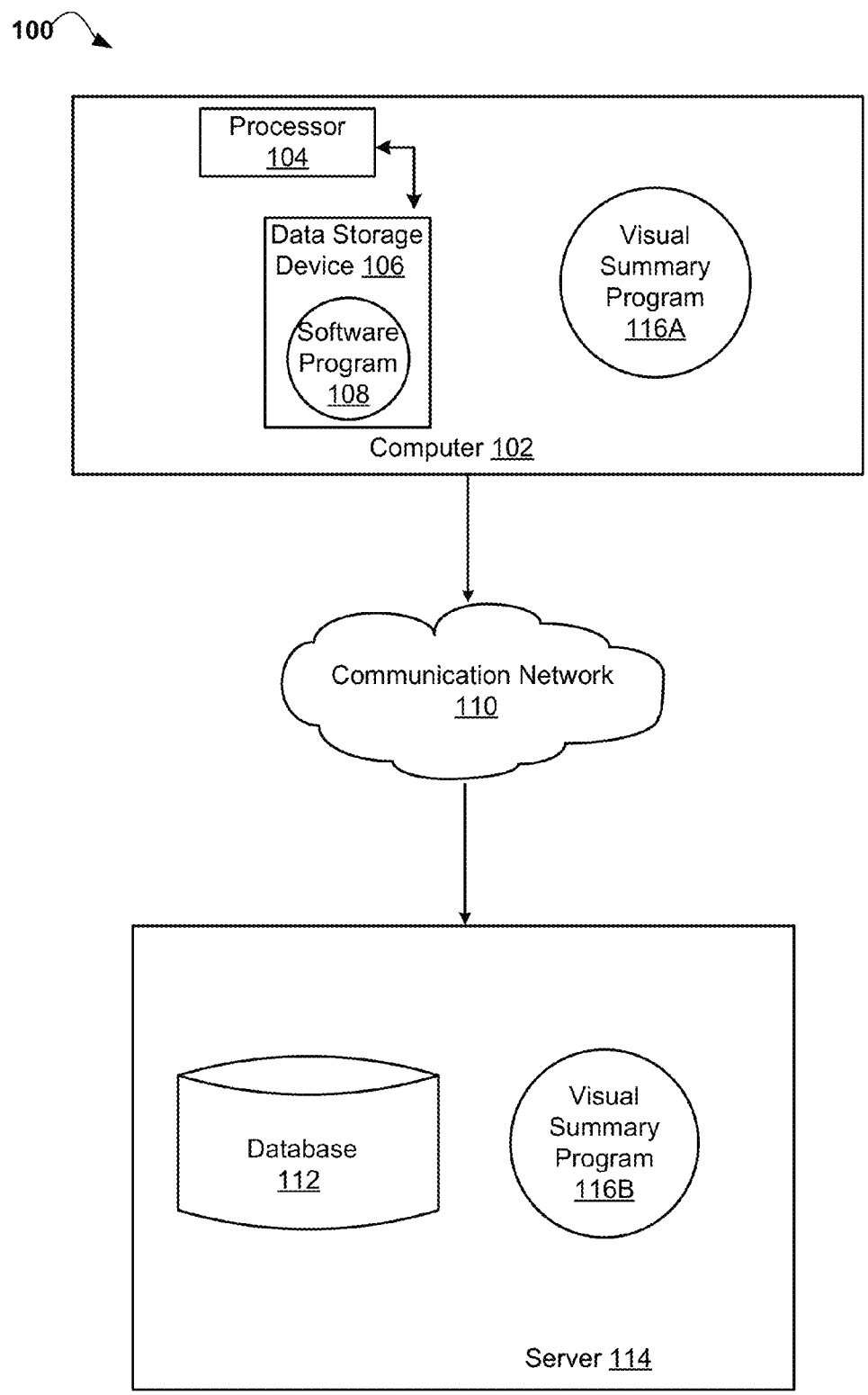
FIG. 1 illustrates a networked computer environment according to one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

Embodiments of the present invention relate generally to the field of computers, and more particularly to natural language question answer (QA) systems. The following described exemplary embodiments provide a system, method and program product to, among other things, provide a visual summary of answers from natural language question answering systems. Therefore, the present embodiment has the capacity to improve the technical field of question answer systems by providing a way to improve the results generated from natural language question answering systems. More specifically, the present embodiment may improve a researcher's ability to determine the validity of results from a question answer system by providing content such as a definition of the answer, evidence of source types, the amount of activity associated with each answer, and recent visitors of the specific answer. As such a researcher may be able to gain a quick overview of the contents of the evidence provided.

As previously described, question answer systems may construct answers by querying a structured database of knowledge or information, such as a knowledge base or by pulling answers from an unstructured collection of natural language documents. As such, a question answer system may provide an abundance of information and answers to the questions posed. However, the validity of these answers may lack consistency. Furthermore, researchers may be busy and therefore, need a search tool that can provide quality answers to their questions quickly. As such, it may be advantageous, among other things, to provide a system that provides a visual summary of answers from natural language question answering systems.

According to at least one implementation, the present embodiment may allow end users, such as researchers, to gain an overview of the answers provided by a natural language question answer system by enabling the researchers to be able to view the information about the evidence provided before spending time going through the provided sources. As such, a researcher may be able to see an overview of an answer to a question and the results may contain content such as a definition of the answer and evidence source types, the amount of activity associated with each answer, and recent visitors of the specific answer. Such information may be very useful for a researcher in determining the validity of an answer and gaining a quick overview of the contents of the evidence within it before her or she delves further. Additionally, having such information may save the researcher time and may allow for easy comparisons with other possible answers to the question. Implementations of the present embodiment may utilize existing technology, such as image processing, optical character recognition, information retrieval, natural language processing (NLP), linear algebra, and statistical modeling.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product to provide a visual summary of answers from natural language question answering systems. As such, the present embodiment may allow end users, such as researchers, to gain an overview of the answers provided by a natural language question answer system by enabling the researchers to be able to view the information about the evidence provided before spending time going through the provided sources.

According to at least one implementation, once an end user, such as a researcher enters a question in a question answer system, such as IBM®'s Watson™ Discovery Advisor, he or she will be returned to a visual summary (i.e., a display of information within a user interface (UI)) that includes a page of answers and for each answer there may be a definition and diagrams showing types of sources, recent activity, and recent viewers. The content within these answer summaries is dynamic and as such, may be constantly changing based on user activity. Therefore, the user may be kept informed and connected at all times with respect to updates associated with the content within the answer summaries. Additionally, the present embodiment may also provide the user with further direction once the user selects an answer. For example, the visual summary displayed may highlight dates with significant activity or a specific type of source within the list of evidence. As such, if the user is unsatisfied with the content in a summary for a provided answer he or she can easily delete the answer and remove it from the results.

More specifically, the present embodiment may indicate a quality of answers to questions asked of a system capable of answering questions (i.e., the system is a search engine run against on-line sources, such as the internet and local secure network sources). As such, a question may be received from a user that was inputted into a system capable of answering questions. Then, the question may be analyzed to determine a possible set of answers. Next, a characterization summarization for each possible answer including links to evidence, definitions, and activity related to each possible answer may be provided, whereby the evidence for each possible answer may include source reliability information selected from a group consisting of, but not limited to journal articles (including a subset of peer reviewed journal articles), blogs, dates, crowd source opinion, references, on-line sources, a determination of how recent the document was created, citation usage, ratings, etc.

Additionally, the present embodiment may provide a user interface (UI) allowing the user to select portions of the characterization summary to adjust questions, save answers, control detail, control activity parameters, select sources, filter results (for example, based on source or attribute, such as time frame), and delete answers.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and a Visual Summary Program 116A. The networked computer environment 100 may also include a server 114 that is enabled to run a Visual Summary Program 116B that may interact with a database 112 and a communication network 110. The networked computer environment 100 may include a plurality of computer 102 and servers 114, only one of which is shown. The communication network may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the Visual Summary Program 116B running on server computer 114 via the communications network 110. The communications network 110 may include connections, such as wire, wireless communication links, or fiber optic cables. As will be discussed with reference to FIG. 5, server computer 114 may include internal components 800a and external components 900a, respectively, and client computer 102 may include internal components 800b and external components 900b, respectively. Client computer 102 may be, for example, a mobile device, a telephone, a personal digital assistant, a netbook, a laptop computer, a tablet computer, a desktop computer, or any type of computing devices capable of running a program, accessing a network, and accessing a database 112. According to various implementations of the present embodiment, the Visual Summary Program 116A, 116B may interact with a database 112 that may be embedded in various storage devices, such as, but not limited to a computer/mobile device 102, a networked server 114, or a cloud storage service.

As previously described, the client computer 102 may access the Visual Summary Program 116B, running on server computer 114 via the communications network 110. For example, a user, such as a researcher, using a client computer 102 may use the Visual Summary Program 116A, 116B to receive improved results generated from a natural language question answering system, such IBM®'s Watson™ Discovery Advisor. The Visual Summary method is explained in more detail below with respect to FIGS. 2-3.

Figure 2:
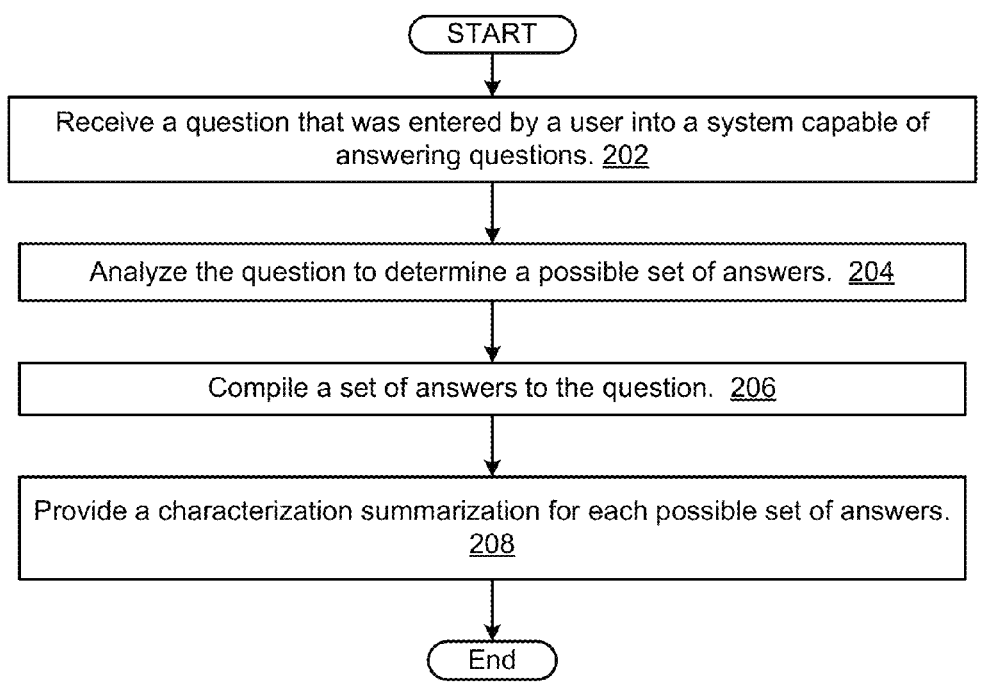
FIG. 2 is an operational flowchart illustrating the steps carried out by a program that provides a visual summary of answers from natural language question answering systems according to at least one embodiment.

Referring now to FIG. 2, an operational flowchart 200 illustrating the steps carried out by a program that provides a visual summary of answers from natural language question answering systems in accordance with one embodiment is depicted. As previously described, the Visual Summary Program 116A, 116B (FIG. 1) may improve a researcher's ability to determine the validity of results to a question inputted into a question answer system by providing visual content such as a definition of the answer, evidence of source types, the amount of activity, a summary, and recent views of the answers and visitors of the websites. As such a researcher may be able to gain a quick visual overview of the contents of the evidence provided. As previously explained, implementations of the present embodiment may utilize existing technology, such as image processing, optical character recognition, information retrieval, natural language processing (NLP), linear algebra, and statistical modeling.

Therefore with respect to FIG. 2 at 202, the Visual Summary Program 116A, 116B (FIG. 1) receives a question that was entered by a user into a system that is capable of answering questions. For example, a user, such as a researcher, may enter a question in a question answer system, such as IBM®'s Watson™ Discovery Advisor.

Then at 204, the Visual Summary Program 116A, 116B (FIG. 1) analyzes the question to determine a possible set of answers. As such, according to at least one implementation, natural language processing techniques may be used to analyze the question entered by the user and a search engine may be used to run against various sources including, but not limited to the internet, local secure network sources, and repositories, such as a database 112 (FIG. 1) to acquire information and answers pertaining to the posed question.

Next at 206, the Visual Summary program 116A, 116B (FIG. 1) compiles the acquired information and answers as a set of answers to the questions. For example, such information and answers may be retrieved from sources including, but not limited to journal articles, blogs, on-line sources, etc. In addition to the acquired source information being compiled, the present embodiment may compile links to evidence, definitions, and activity related to each possible answer. Furthermore, the evidence for each possible answer may include source reliability information selected from a group consisting of, but not limited to journal articles (including a subset of peer reviewed journal articles), blogs, dates, crowd source opinion, references, on-line sources, a determination of how recent the document was created, citation usage, ratings, etc.

Then at 208, the Visual Summary Program 116A, 116B (FIG. 1) provides a characterization summarization for each possible set of answers to the user. According to at least one implementation the characterization summarization for each possible answer includes the links to the compiled evidence, definitions, and activity related to each possible answer as well as the source reliability information previously described with respect to step 206.

Additionally, the present embodiment may provide a user interface (UI) allowing the user to select portions of the characterization summary to adjust questions, save answers, control detail, control activity parameters, select sources, filter results (for example, based on source or attribute, such as time frame), and delete answers.

It may be appreciated that FIG. 2 provides only an illustration of one implementation and does not imply any limitations with regard to how different embodiments may be implemented. Many modifications to the depicted environments may be made based on design and implementation requirements. The present embodiment may be implemented as a dynamic system related to cognitive computing and the visual display of information (i.e., a visual summary of content including definitions and diagrams that may define answers and show the source for which the answers are based) within a user interface. Additionally, the present embodiment may provide a summary at an aggregate level across multiple articles. Therefore, the proposed invention summary represents a grouping of articles that support an individual answer. As such, a breakdown may be provided that may include article sources, activity, and views by other individuals. Thus, the present embodiment may show the sources that the search system is pulling from via a visual summary of them that is tied to a specific answer so as to allow the user to gauge whether the answer is well justified and has a higher potential to be correct. This may be significant for open-ended questions that have no clear right or wrong answers. According to at least one implementation the data may be compiled and placed in a visual summary to allow the user to gauge whether to trust the answers in a natural language question answer system based on the sources, evidence sets, or data that it is pulling from. However, the data is not altered in any way.

Figure 3:
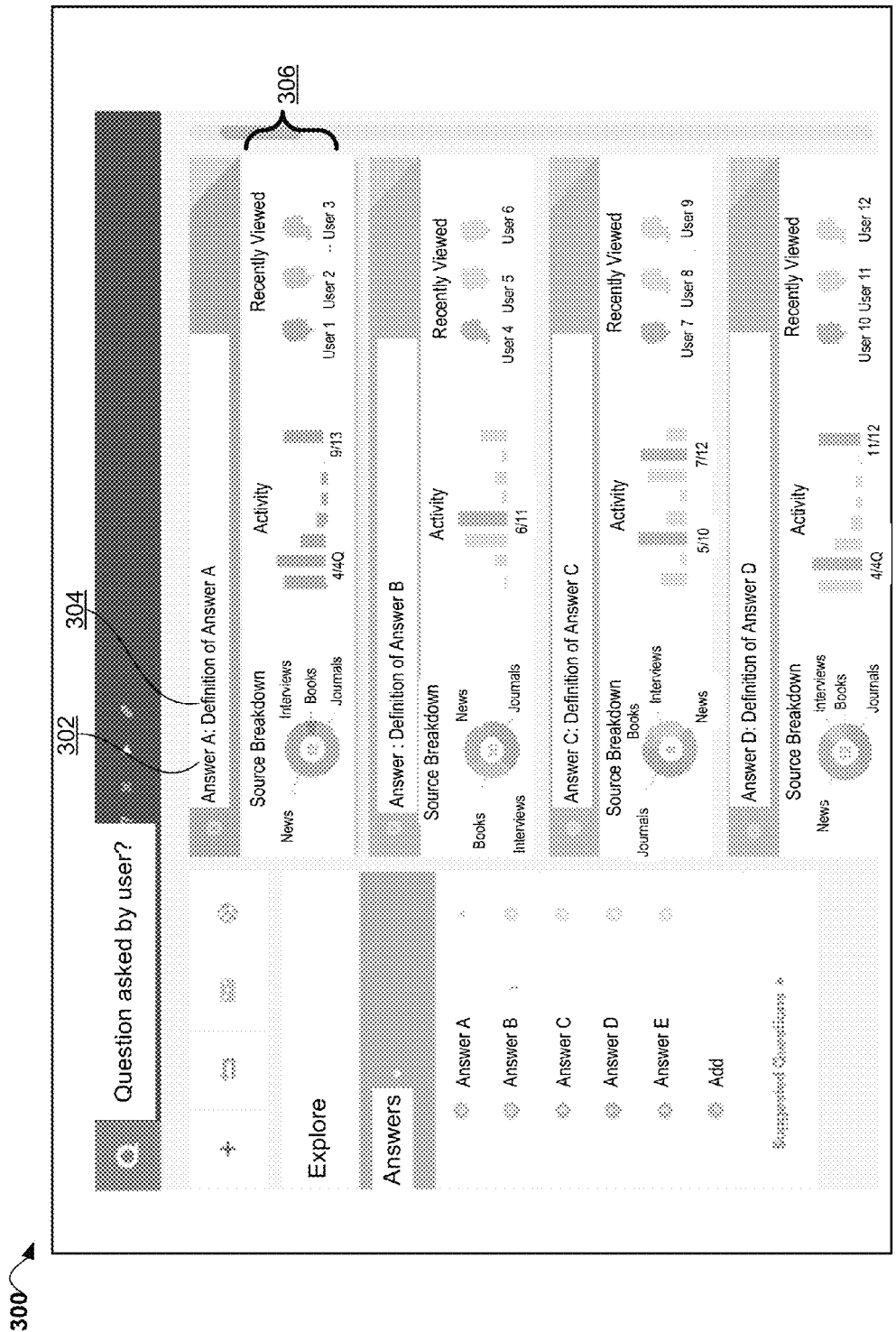
FIGS. 3-4 are exemplary illustrations of question and answer results according to at least one embodiment.
Figure 4:
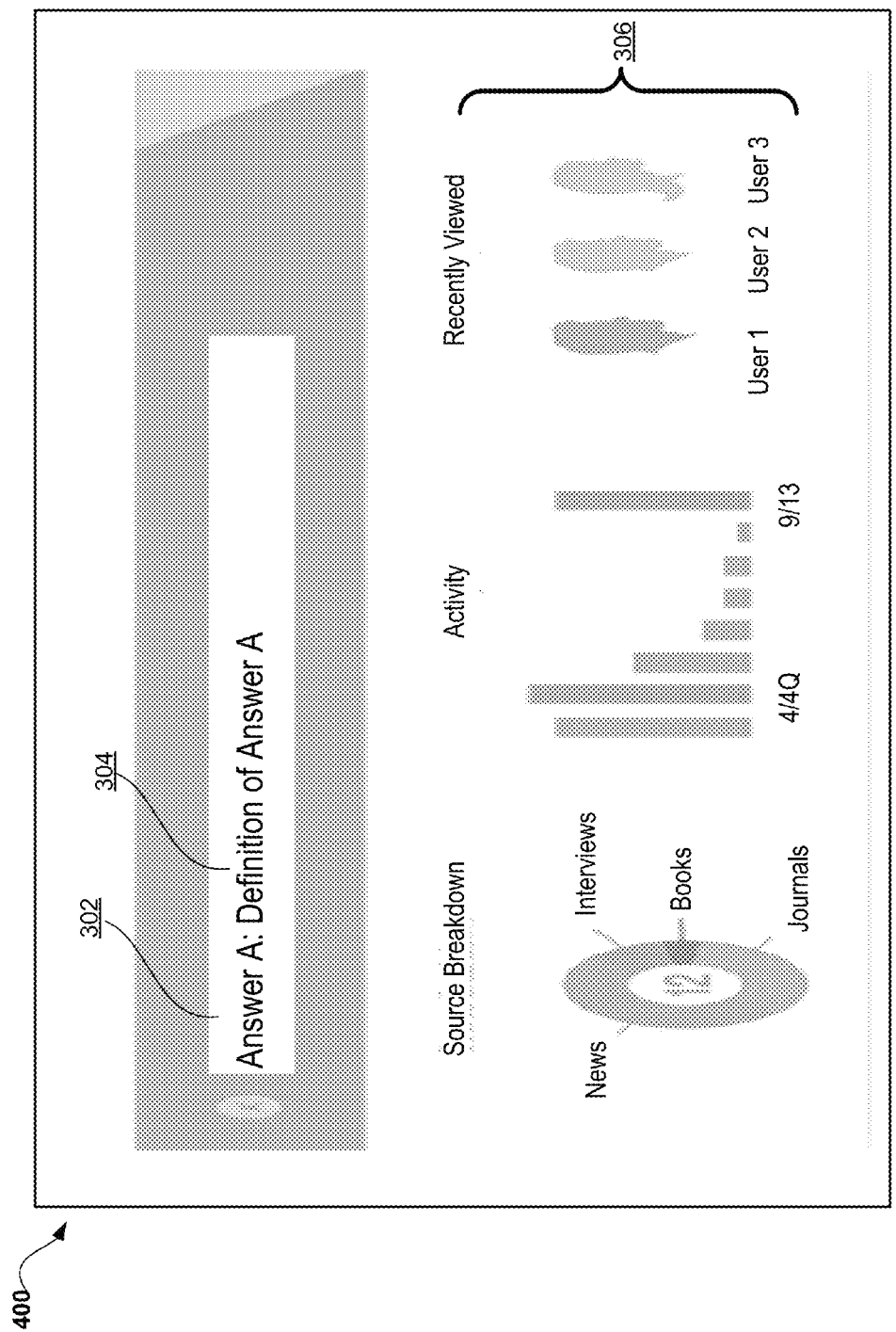

Referring now to FIGS. 3-4, exemplary illustrations 300, 400 of question and answer results in accordance with one embodiment is depicted. As previously explained, once a user, such as a researcher, enters a question in a question answer system, he or she will be returned to a page of answers 300, 400. For each answer 302 there will be a definition 304 and diagrams 306 showing types of sources, recent activity, and recent viewers. The content within these answer summaries will be constantly changing (i.e., dynamic) based on user activity to keep the user informed and connected at all times. It can also provide the user with direction once inside the answer as to dates with significant activity or a specific type of source within the list of evidence. If the user is unsatisfied with the content in a summary for a provided answer he or she may easily delete the answer and remove it from the results.

Figure 5:
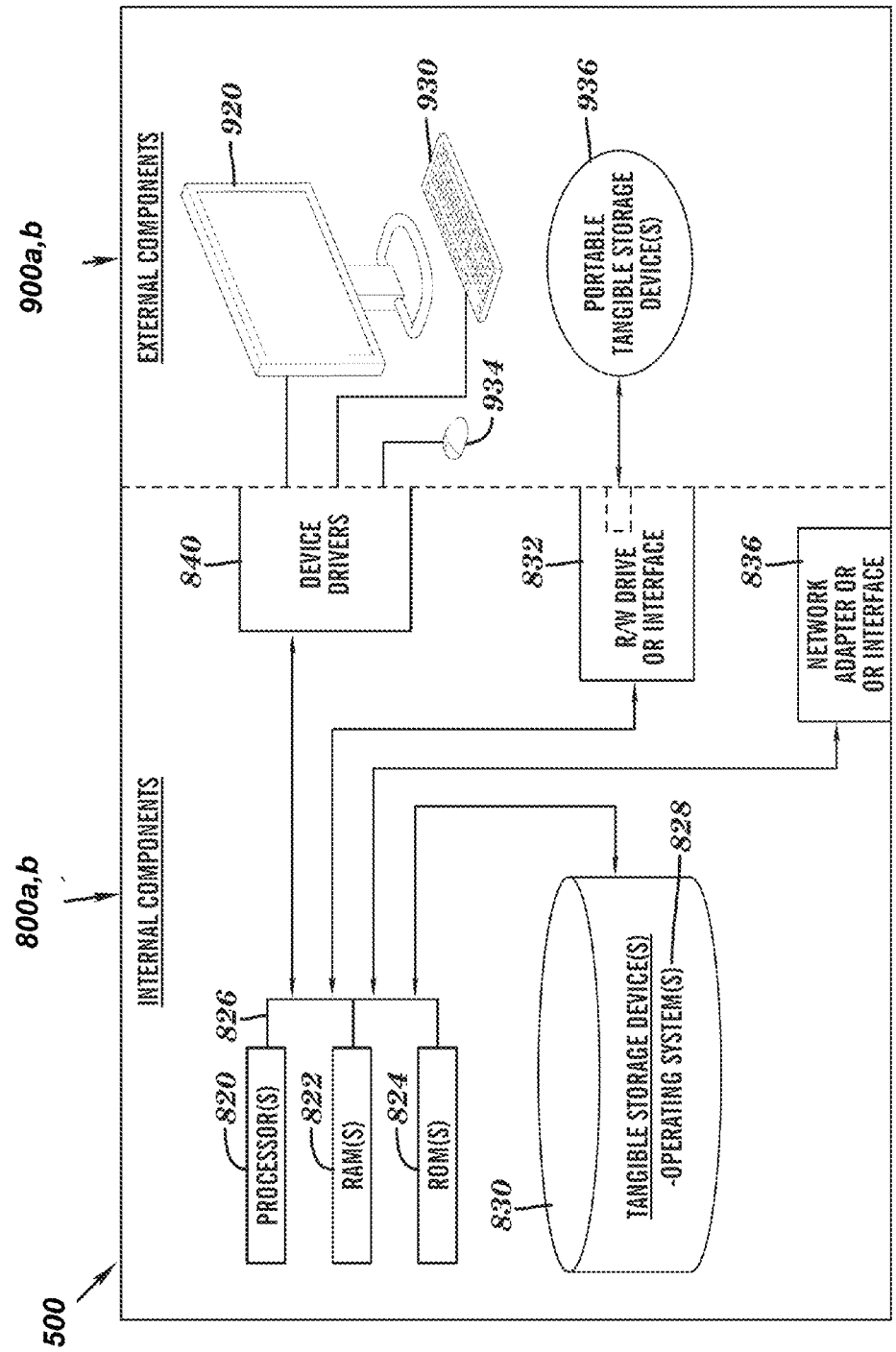
FIG. 5 is a block diagram of internal and external components of computers and servers depicted in FIG. 1 according to at least one embodiment.

FIG. 5 is a block diagram 500 of internal and external components of computers depicted in FIG. 1 in accordance with an illustrative embodiment of the present invention. It should be appreciated that FIG. 5 provides only an illustration of one implementation and does not imply any limitations with regard to the environments in which different embodiments may be implemented. Many modifications to the depicted environments may be made based on design and implementation requirements.

Data processing system 800, 900 is representative of any electronic device capable of executing machine-readable program instructions. Data processing system 800, 900 may be representative of a smart phone, a computer system, PDA, or other electronic devices. Examples of computing systems, environments, and/or configurations that may be represented by data processing system 800, 900 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 (FIG. 1) and network server 114 (FIG. 1) may include respective sets of internal components 800 a,b and external components 900 a,b illustrated in FIG. 5. Each of the sets of internal components 800 include one or more processors 820, one or more computer-readable RAMs 822 and one or more computer-readable ROMs 824 on one or more buses 826, and one or more operating systems 828 and one or more computer-readable tangible storage devices 830. The one or more operating systems 828 and the Software Program 108 (FIG. 1) and the Visual Summary Program 116A (FIG. 1) in client computer 102 (FIG. 1) and the Visual Summary Program 116B (FIG. 1) in network server 114 (FIG. 1) are stored on one or more of the respective computer-readable tangible storage devices 830 for execution by one or more of the respective processors 820 via one or more of the respective RAMs 822 (which typically include cache memory). In the embodiment illustrated in FIG. 5, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800 a,b also includes a R/W drive or interface 832 to read from and write to one or more portable computer-readable tangible storage devices 936 such as a CD-ROM, DVD, memory stick, magnetic tape, magnetic disk, optical disk or semiconductor storage device. A software program, such as the Software Program 108 (FIG. 1) and the Visual Summary Program 116A, 116B (FIG. 1) can be stored on one or more of the respective portable computer-readable tangible storage devices 936, read via the respective R/W drive or interface 832 and loaded into the respective hard drive 830.

Each set of internal components 800 a,b also includes network adapters or interfaces 836 such as a TCP/IP adapter cards, wireless Wi-Fi interface cards, or 3G or 4G wireless interface cards or other wired or wireless communication links. The Software Program 108 (FIG. 1) and the Visual Summary Program 116A (FIG. 1) in client computer 102 (FIG. 1) and the Visual Summary Program 116B (FIG. 1) in network server 114 (FIG. 1) can be downloaded to client computer 102 (FIG. 1) and network server 114 (FIG. 1) from an external computer via a network (for example, the Internet, a local area network or other, wide area network) and respective network adapters or interfaces 836. From the network adapters or interfaces 836, the Software Program 108 (FIG. 1) and the Visual Summary Program 116A (FIG. 1) in client computer 102 (FIG. 1) and the Visual Summary Program 116B (FIG. 1) in network server 114 (FIG. 1) are loaded into the respective hard drive 830. The network may comprise copper wires, optical fibers, wireless transmission, routers, firewalls, switches, gateway computers and/or edge servers.

Each of the sets of external components 900 a,b can include a computer display monitor 920, a keyboard 930, and a computer mouse 934. External components 900 a,b can also include touch screens, virtual keyboards, touch pads, pointing devices, and other human interface devices. Each of the sets of internal components 800 a,b also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
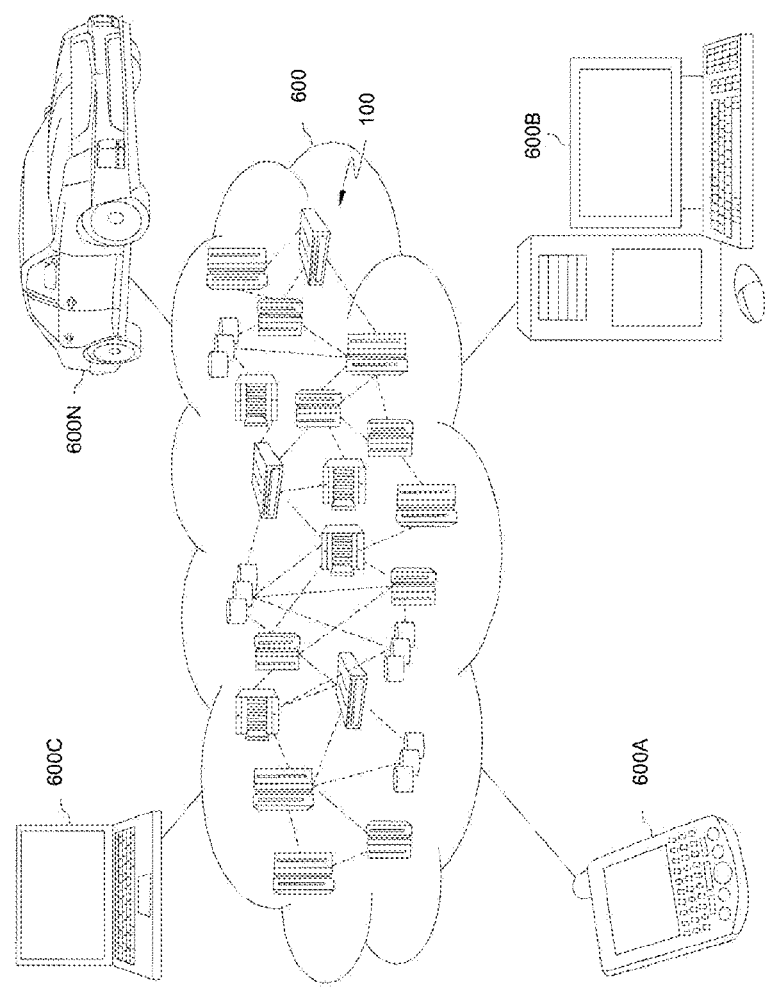
FIG. 6 is a block diagram of an illustrative cloud computing environment including the computer system depicted in FIG. 1, in accordance with an embodiment of the present disclosure.

Referring now to FIG. 6, illustrative cloud computing environment 600 is depicted. As shown, cloud computing environment 600 comprises one or more cloud computing nodes 100 with which local computing devices used by cloud consumers, such as, for example, personal digital assistant (PDA) or cellular telephone 600A, desktop computer 600B, laptop computer 600C, and/or automobile computer system 600N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 600 to offer infrastructure, platforms and/or software as services for which a cloud consumer does not need to maintain resources on a local computing device. It is understood that the types of computing devices 600A-N shown in FIG. 6 are intended to be illustrative only and that computing nodes 100 and cloud computing environment 600 can communicate with any type of computerized device over any type of network and/or network addressable connection (e.g., using a web browser).

Figure 7:
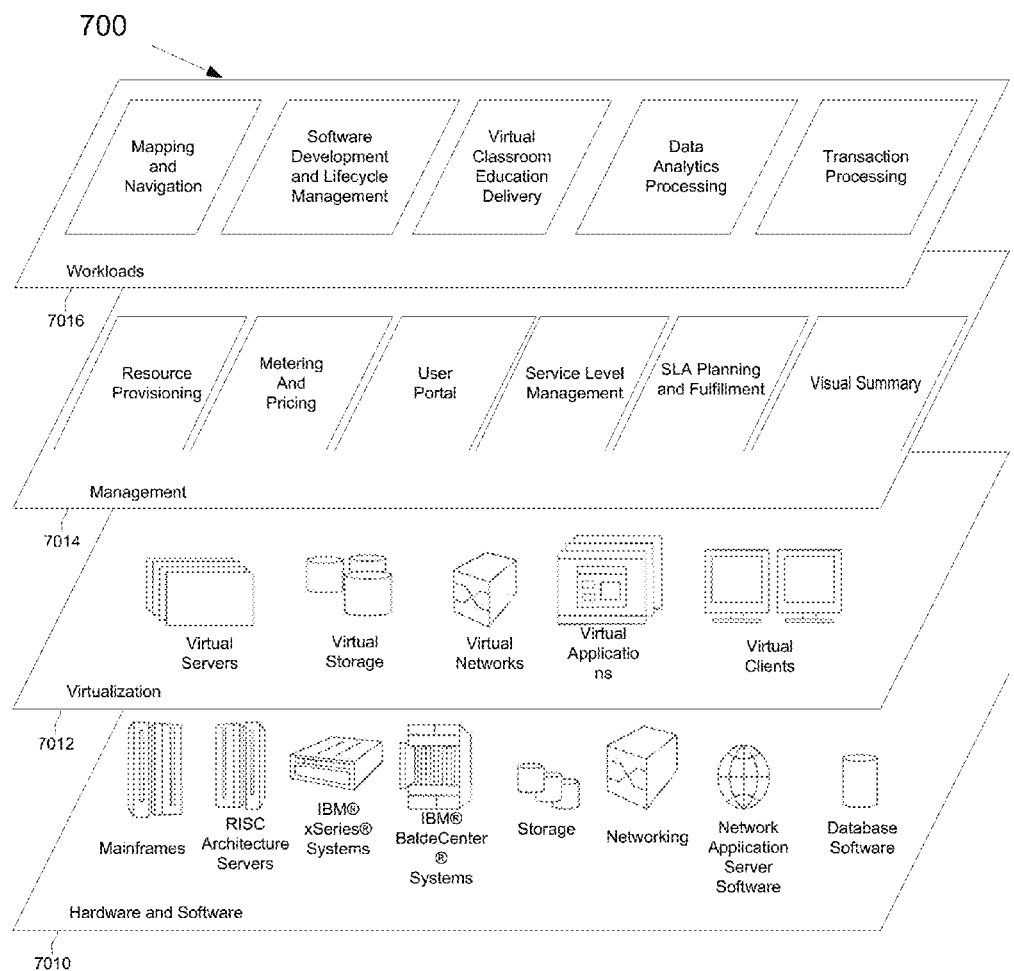
FIG. 7 is a block diagram of functional layers of the illustrative cloud computing environment of FIG. 6, in accordance with an embodiment of the present disclosure.

Referring now to FIG. 7, a set of functional abstraction layers 700 provided by cloud computing environment 600 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 7010 includes hardware and software components. Examples of hardware components include: mainframes; RISC (Reduced Instruction Set Computer) architecture based servers; storage devices; networks and networking components. In some embodiments, software components include network application server software.

Virtualization layer 7012 provides an abstraction layer from which the following examples of virtual entities may be provided: virtual servers; virtual storage; virtual networks, including virtual private networks; virtual applications and operating systems; and virtual clients.

In one example, management layer 7014 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA. A Visual Summary Program may improve a researcher's ability to determine the validity of results from a question answer system by providing content such as a definition of the answer, evidence of source types, the amount of activity, and recent visitors of the specific answer. As such a researcher may be able to gain a quick overview of the contents of the evidence provided.

Workloads layer 7016 provides examples of functionality for which the cloud computing environment may be utilized. Examples of workloads and functions which may be provided from this layer include: mapping and navigation; software development and lifecycle management; virtual classroom education delivery; data analytics processing; and transaction processing.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for providing a visual summary of a plurality of answers associated with a question entered into a natural language question answer system, the method comprising:
   receiving the entered question;
   analyzing the entered question to determine a plurality of possible answers to the entered question;
   compiling a set of answers based on the analysis of the entered question and the determined plurality of possible answers; and
   providing a characterization summary for the compiled set of answers, wherein the characterization summary includes an indication of the quality associated with each answer within the compiled set of answers, and wherein the characterization summary is a visual summary that includes a definition and a plurality of diagrams displaying a plurality of information including a source category, a recent activity category, and a recent viewer category, wherein there is at least one diagram displayed that corresponds to each category of information displayed within the displayed plurality of information.

2. The method of claim 1, further comprising:
determining a plurality of links to evidence, a plurality of definitions, and a plurality of activity related to each answer within the compiled set of answers.

3. The method of claim 2, wherein the characterization summary for the compiled set of answers comprises at least one of the determined plurality of links to evidence, the determined plurality of definitions, and the determined plurality of activity related to each answer within the compiled set of answers.

4. The method of claim 2, wherein determining the plurality of links to evidence comprises determining a plurality of source reliability information.

5. The method of claim 4, wherein the determined source reliability information is selected from a group including at least one of a plurality of journal articles; a plurality of peer reviewed journal articles, a plurality of blogs, a plurality of dates, a plurality of crowd source opinion, a plurality of references, a plurality of on-line sources, a determination of how recent the document was created, a citation usage, and a plurality of ratings.

6. The method of claim 1, wherein analyzing the entered question includes a use of a plurality of natural language processing techniques and a search engine to run against a plurality of online sources, a plurality of local secure network sources, and a plurality of repositories to acquire a plurality of information and answers pertaining to the entered question.

7. The method of claim 1, further comprising:
providing a user interface (UI) to allow a user to select at least one portion of the characterization summary to adjust a plurality of questions, to save a plurality of answers, to control a plurality of detail, to control a plurality of activity parameters, to control a plurality of sources, to filter a plurality of answers based on a source or attribute, and to delete at least one answer within the plurality of answers.

8. A computer system for providing a visual summary of a plurality of answers associated with a question entered into a natural language question answer system, the computer system comprising:
one or more processors, one or more computer-readable memories, one or more computer-readable tangible storage devices, and program instructions stored on at least one of the one or more storage devices for execution by at least one of the one or more processors via at least one of the one or more memories, wherein the computer system is capable of performing a method comprising:
receiving the entered question;
analyzing the entered question to determine a plurality of possible answers to the entered question;
compiling a set of answers based on the analysis of the entered question and the determined plurality of possible answers; and
providing a characterization summary for the compiled set of answers, wherein the characterization summary includes an indication of the quality associated with each answer within the compiled set of answers, and wherein the characterization summary is a visual summary that includes a definition and a plurality of diagrams displaying a plurality of information including a source category, a recent activity category, and a recent viewer category, wherein there is at least one diagram displayed that corresponds to each category of information displayed within the displayed plurality of information.

9. The computer system of claim 8, further comprising:
determining a plurality of links to evidence, a plurality of definitions, and a plurality of activity related to each answer within the compiled set of answers.

10. The computer system of claim 9, wherein the characterization summary for the compiled set of answers comprises at least one of the determined plurality of links to evidence, the determined plurality of definitions, and the determined plurality of activity related to each answer within the compiled set of answers.

11. The computer system of claim 9, wherein determining the plurality of links to evidence comprises determining a plurality of source reliability information.

12. The computer system of claim 11, wherein the determined source reliability information is selected from a group including at least one of a plurality of journal articles; a plurality of peer reviewed journal articles, a plurality of blogs, a plurality of dates, a plurality of crowd source opinion, a plurality of references, a plurality of on-line sources, a determination of how recent the document was created, a citation usage, and a plurality of ratings.

13. The computer system of claim 8, wherein analyzing the entered question includes a use of a plurality of natural language processing techniques and a search engine to run against a plurality of online sources, a plurality of local secure network sources, and a plurality of repositories to acquire a plurality of information and answers pertaining to the entered question.

14. The computer system of claim 8, further comprising:
providing a user interface (UI) to allow a user to select at least one portion of the characterization summary to adjust a plurality of questions, to save a plurality of answers, to control a plurality of detail, to control a plurality of activity parameters, to control a plurality of sources, to filter a plurality of answers based on a source or attribute, and to delete at least one answer within the plurality of answers.

15. A computer program product for providing a visual summary of a plurality of answers associated with a question entered into a natural language question answer system, the computer program product comprising:
one or more computer-readable storage devices and program instructions stored on at least one of the one or more tangible storage devices, the program instructions executable by a processor, the program instructions comprising:
program instructions to receive the entered question;
program instructions to analyze the entered question to determine a plurality of possible answers to the entered question;
program instructions to compile a set of answers based on the analysis of the entered question and the determined plurality of possible answers; and
program instructions to provide a characterization summary for the compiled set of answers, wherein the characterization summary includes an indication of the quality associated with each answer within the compiled set of answers, and wherein the characterization summary is a visual summary that includes a definition and a plurality of diagrams displaying a plurality of information including a source category, a recent activity category, and a recent viewer category, wherein there is at least one diagram displayed that corresponds to each category of information displayed within the displayed plurality of information.

16. The computer program product of claim 15, further comprising:
program instructions to determine a plurality of links to evidence, a plurality of definitions, and a plurality of activity related to each answer within the compiled set of answers.

17. The computer program product of claim 16, wherein the characterization summary for the compiled set of answers comprises at least one of the determined plurality of links to evidence, the determined plurality of definitions, and the determined plurality of activity related to each answer within the compiled set of answers.

18. The computer program product of claim 16, wherein determining the plurality of links to evidence comprises determining a plurality of source reliability information.

19. The computer program product of claim 18, wherein the determined source reliability information is selected from a group including at least one of a plurality of journal articles; a plurality of peer reviewed journal articles, a plurality of blogs, a plurality of dates, a plurality of crowd source opinion, a plurality of references, a plurality of on-line sources, a determination of how recent the document was created, a citation usage, and a plurality of ratings.

20. The computer program product of claim 15, wherein analyzing the entered question includes a use of a plurality of natural language processing techniques and a search engine to run against a plurality of online sources, a plurality of local secure network sources, and a plurality of repositories to acquire a plurality of information and answers pertaining to the entered question.

* * * * *